Nov. 15, 1955
C. MATTIO
2,723,863
HAND VEHICLE FOR NEWSPAPERS
Filed July 29, 1950
2 Sheets-Sheet 2
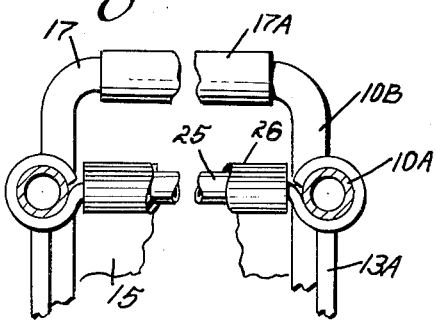
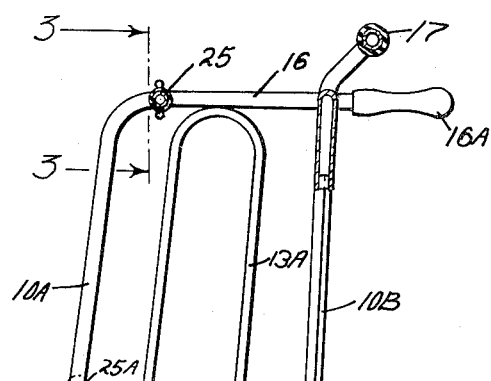
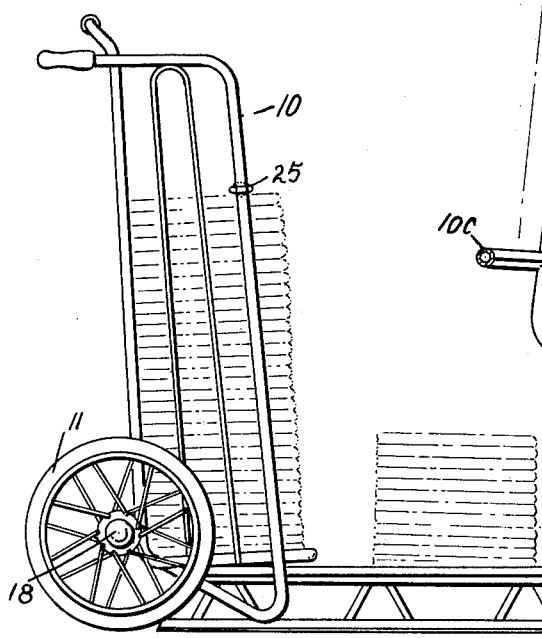
INVENTOR.
CHRISTY MATTIO
BY Bates, Teare, & McBean
Attorneys

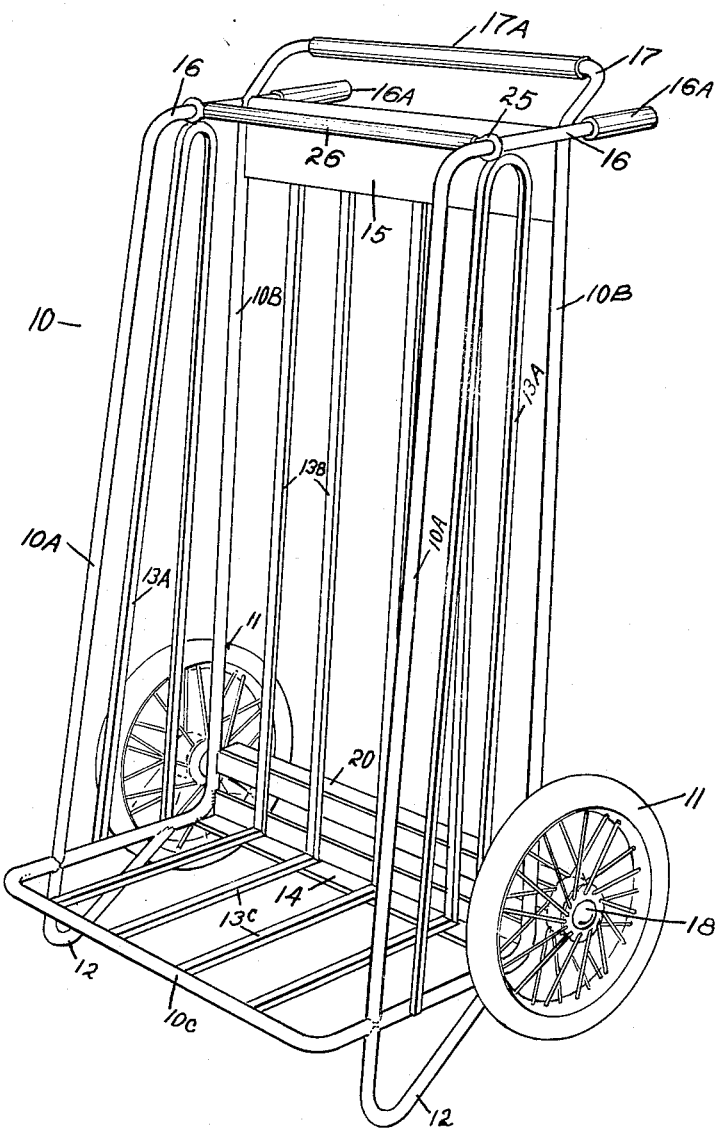

United States Patent Office 2,723,863
Patented Nov. 15, 1955

2,723,863

HAND VEHICLE FOR NEWSPAPERS

Christy Mattio, Lakewood, Ohio

Application July 29, 1950, Serial No. 176,754

1 Claim. (Cl. 280—47.24)

This invention relates to load supporting and transferring carriers generally and more particularly to a hand vehicle for carrying newspapers and the like.

Among the various types and classes of load supporting and transferring carriers are general purpose carriers and others which are particularly developed and adapted to meet individual problems in specialized carrier lines. In the specialized carrier lines it is not only a matter of convenience and utility but also is a matter of necessity to develop a carrier having optimum individual features and characteristics which have special utility operating in favor of a practicable carrier for that particular line.

The present invention is particularly directed to provide a practicable carrier of the hand vehicle type for carrying newspapers and the like. By way of exemplary explanation, some of the individual problems of this type of carrier relate to the manner in which the newspapers are mounted within the carrier in order to provide simple and efficient loading and unloading of bulk newspapers to and from the carrier. In like manner such a carrier should be constructed to provide for ready individual access to the newspapers and the like carried thereon.

Additional special features relate to the manner of operation of the carrier which involves a plurality of stops and stand-stills during the course of a limited delivery distance under all kinds of weather conditions and over all sorts of terrain. For example, such a carrier must be able to travel over street curbs, up and down steps and sidewalks, and along various degrees of grades and surfaces. The carrier must also be capable of operation by a single operator and consequently special consideration must be given to a construction which would have a limited weight and zise for optimum handling by a sole operator.

Accordingly, it is an object of this invention to provide a light weight carrier of the hand vehicle type which may be efficiently operated by a sole operator.

Another object of this invention is to provide a hand vehicle type newspaper carrier construction which enables simple and efficient loading and unloading of either bulk or individual newspaper loads.

A further object of this invention is to provide a hand vehicle type newspaper carrier which will efficiently negotiate all types of terrain with or without load.

Briefly, in accordance with this invention there is provided an axle rotatably supporting a pair of spaced ground engaging wheels having a relatively large wheel base and also pivotally supporting thereon, for rotation in a vertical plane, a tubular frame carrier forming a load supporting base with adjacent vertical back and sides leaving access to the interior thereof through one side and the top of the frame for loading newspapers therein. The frame carrier is mounted forwardly of the main wheel axle and extends from the base, which is above ground level, vertically a suitable distance above the wheel axle. Supporting legs on the base of the frame provide an additional carrier support spaced from the axle for limiting the rotation of the frame in one direction relative to the ground as well as providing a stand for the frame on the ground when not in motion.

Fig. 1 is a perspective view of the hand vehicle carrier of this invention illustrating the open, light-weight frame supported on the wheel axle in a stand-still position; Fig. 2 is a side cross-sectional view of the carrier taken on a central vertical plane through Fig. 1; Fig. 3 is a cross-sectional view of the handle arrangement taken on the lines 3—3 in Fig. 2; Fig. 4 is an exemplary illustration showing how the carrier may be used to load newspapers in bulk onto a sled or the like.

Referring now to Fig. 1, there is shown in perspective an assembled hand vehicle type newspaper carrier which is the subject of this invention. The carrier embodies an open frame 10 pivotally mounted on an axle cross-member 21 for rotation in a vertical plane about the axle 18 which supports ground engaging wheels 11. The carrier has supporting legs 12 on the under-side of the base frame and spaced forwardly of the wheel axle. In this illustration the carrier is shown in a stand-still position, wherein the frame is supported forwardly of the pivot point by the supporting members 12 and at the pivot point by the wheels and axle.

The main body of the frame carrier 10 is formed of three adjacent vertical frame sides and a frame base and is open at one side and at the top. The entire frame is preferably constructed from light-weight, tubular metal which is bent and formed into the desired shape and assembled in a welded frame construction. It will be noted that the lightweight tubular frame construction forms only the outline of the sides and the base of the carrier frame and that other frame members of solid metal stock, indicated at 14 and 15 are welded to the tubular frame within the planes of the sides and the base to form a semi-closed load retaining structure and to provide reinforcement and rigidity to the frame carrier.

In the construction illustrated in Fig. 1, the main carrier frame is comprised of four tubular members welded or otherwise connected together. Two of the tubular members 10A form the side frame sections of the carrier to prevent lateral shifting of the load and have their end extensions forming handles 16 at the top of the carrier and supporting legs 12 at the base of the carrier. A second tubular member 10B forms part of the frame base and the back side or load rest of the carrier to provide a support and rest for the load as well as a push-type bar handle 17 extending across the rear of the carrier frame parallel with the main wheel axle. The other tubular member 10C forms an extension of the base forward of the side tubular members. Suitable hand grips 16A and 17A, of hard rubber or the like, are provided for the handles 16 and 17 respectively.

The frame reinforcing member 14 is preferably an angle bar welded at each side to the tubular back frame member 10B at the bend which forms the base and back of the carrier. This arrangement provides a rigid structure at the base of the carrier as well as a contact support for one end of the reinforcing members 13B and 13C which provide a load supporting surface and rigidity in the plane of the base and back of the carrier frame. The other ends of the reinforcing members 13C in each plane are welded to the tubular frame member 10C in the base while the other ends of the members 13B are welded to a reinforcing cross-member 15 at the top of the back load rest. The cross-member 15 is welded at each end to the tubular back frame members 10B near the top of the back frame just below the bar handle 17.

The reinforcing members 13A which are welded to the tubular side frame members 10A within the plane of the carrier sides are formed from a continuous strip of metal stock which is bent into a U form. The base of the U portion is welded to the top or handle portion 16 of the tubular side frame members 10A, while the open ends are welded to the base portion of the tubular members 10B.

The frame carrier 10 is rigidly mounted on the axle cross member 21 by means of an angle bar 20 which is welded between the tubular frame portions 10B forming the rear or back side of the carrier. If the carrier is constructed as illustrated in Fig. 1, the angle member 20 and axle cross member 21 are positioned slightly above the turn in the tubular member 10B forming the rear and base so that the carrier base extends below the wheel axle and pivot points to facilitate the pivotal mounting and operation.

The cross-sectional view of Fig. 2 illustrates the relation between the carrier frame and the wheels and axle when in the stand-still position, as well as showing the connection between the pivot angle member 20 secured to the back side of the carrier frame and the axle cross member 21. Each of the wheels 11 preferably has a large wheel base which will enhance the negotiation of difficult terrain and may, if desired, be bicycle wheels or the like. The wheels illustrated in the drawings are individually mounted for rotation on the wheel axle 18. Fig. 2 also illustrates how the pivotal connection of the carrier frame 10 to the wheel axle may be utilized in the operation of the carrier in that the angle member 20 may be used as a footing to aid the operator's hands in pivoting the loaded carrier about the wheel axle. A footing strip 19 of suitable material such as hard rubber may be mounted on the extended leg of the angle member 20 to increase footing friction.

Inasmuch as the carrier frame is a substantially open framework, I have provided means whereby the individual newspapers and the like may be retained in loaded condition within the carrier so as not to be inadvertently withdrawn or blown away from the carried position within the carrier frame. To accomplish this, a retainer in the form of a weighted bar 25 is slidably mounted on the tubular side bars 10A of the carrier frame. The retainer is in the form of a metal bar which is loosely looped at each end around a tubular side bar 10A, thereby allowing the retainer bar 25 to slide along the frame bars. Thus, the retainer bar 25 may be positioned at the top of the carrier frame out of the way of a loading operation and then may be slid along the side frame members 10A and dropped into position at the top of the newspaper load within the carrier, as shown by the broken line position 25A in Fig. 2. A plastic or hard rubber roller 26 may be mounted for free rotation on the retainer bar 25 so that it is merely necessary to grasp the forward edge of the newspaper or the like and withdraw it from the carrier load position between the roller member 26 and the supporting load of lower newspapers. Then as the top paper is withdrawn, the weighted retainer bar 25 will drop into position on the next lower newspaper to retain that paper and supporting load in position within the carrier. This arrangement is best illustrated in detail in the partial cut-away views of the top portion of the carrier frame shown in Fig. 3 of the drawings.

Referring now to Fig. 4 where like numerals designate like parts, the carrier of this invention is illustrated in exemplary position relative to a sled for bulk loading from the sled to the carrier or vice versa, indicating the versatile utility of the carrier in the transfer and handling of newspapers and the like. Moreover, if desired, the loaded carrier may be supported either in vertical or horizontal position for transportation upon a sled or the like. The illustration in Fig. 4 also suggests a modified form of carrier frame structure wherein the frame may be comprised of only three tubular members, namely, the side frame portions 10A and the supporting back and base portion 10B of the carrier which portions are welded together at the adjoining points to form the completed frame carrier structure 10. Assembly modifications other than those illustrated in Figs. 1, 2 and 4 will occur to those skilled in the art. For example, the back load rest, base, and side portions of the frame carrier could be formed from one continuous tubular frame member implemented by suitable load retaining and reinforcing members. The illustrations of the drawings are intended to be exemplary only in this respect. The frame construction of the carrier of this invention is a lightweight and low-cost structure which may be easily manufactured and assembled for relatively high production schedules and having resultant low manufacturing costs.

The carrier of this invention is constructed in the form of a lightweight hand vehicle which may be efficiently operated by a single operator in travel and which may be simply and efficiently loaded and unloaded, bulk or otherwise. Additionally, the carrier is so constructed as to provide a hand vehicle which will negotiate all types of terrains, with or without load, and which is provided with suitable protection for use in all sorts of weather. The distinctive features of this carrier are particularly applicable to the transfer and handling of newspapers and the like insofar as the peculiar characteristics of such operation are concerned. However, the carrier may be used to transfer and handle other types of goods under like circumstances and conditions of operation.

I have shown and described what I consider to be the preferred embodiments of my invention along with similar modified forms, and it will be obvious to those skilled in the art that other changes and modifications may be made without departing from the scope of this invention as defined by the appended claim.

I claim:

In a carrier of the type described, a tubular frame forming a base, a back and two vertical sides leaving one side open, reinforcing bars rigidly attached to said frame within the planes of said tubular frame base back and sides respectively, a cross member carried by the frame at the junction of said back and base and extending between the frame sides, a second cross member vertically spaced from the first cross member and rigidly fixed to the frame between the sides thereof, said second cross member being disposed substantially in the plane of said back and forming a stepped portion extending in a horizontal plane normal to and outwardly from said back, a sleeve positioned within the step formed by the second cross member and rigidly fastened thereto, an axle mounted within said sleeve, a pair of ground-engaging wheels journalled on the axle, and said tubular frame forming a bar handle substantially parallel to and adjacent the top of said back portion.

References Cited in the file of this patent

UNITED STATES PATENTS

| | | |
|---|---|---|
| D. 148,684 | Fletcher | Feb. 17, 1948 |
| 7,575 | Drake | Aug. 20, 1850 |
| 327,750 | Yothers et al. | Oct. 6, 1885 |
| 592,177 | Stutsman | Oct. 19, 1897 |
| 616,443 | Anderson | Dec. 27, 1898 |
| 1,187,939 | Taylor | June 20, 1916 |
| 1,339,514 | Johnson | May 11, 1920 |
| 1,819,601 | Hiatt | Aug. 18, 1931 |
| 1,820,728 | Calis | Aug. 25, 1931 |
| 1,942,562 | Meyer | Jan. 9, 1934 |
| 2,048,461 | Mosgoffian | July 21, 1936 |
| 2,113,294 | Dotten | Apr. 5, 1938 |
| 2,373,412 | Plecki | Apr. 10, 1945 |
| 2,479,467 | Bryant | Aug. 16, 1949 |
| 2,487,441 | Heilbronn | Nov. 8, 1949 |

FOREIGN PATENTS

| | | |
|---|---|---|
| 47,673 | France | Mar. 9, 1937 |
| | (1st Addition to 795,087) | |
| 906,612 | France | May 22, 1945 |